United States Patent [19]

Torres

[11] Patent Number: 5,479,824

[45] Date of Patent: Jan. 2, 1996

[54] ON-LINE SHAFT CRACK DETECTOR

[75] Inventor: Martin R. Torres, San Jose, Calif.

[73] Assignee: General Electric Company, San Jose, Calif.

[21] Appl. No.: 170,966

[22] Filed: Dec. 21, 1993

[51] Int. Cl.$^6$ .................................................. G01N 29/04
[52] U.S. Cl. ............................. 73/602; 73/660; 364/507
[58] Field of Search .................................. 364/507, 576, 364/551.02, 571.07; 73/602, 660, 659; 340/680

[56] References Cited

U.S. PATENT DOCUMENTS 4,282,756  8/1981  Molnar ........................................ 73/650

Primary Examiner—Hezron E. Williams
Assistant Examiner—Christine K. Oda
Attorney, Agent, or Firm—James E. McGinness

[57] ABSTRACT

A method and a device for detecting a circumferential or thumbnail-shaped transverse crack which has developed in a shaft connecting a driving component (motor) to a driven component (pump) and then estimating crack size. Crack detection and crack size estimation are performed while the machinery is operating. This shaft monitoring device will alert equipment operators that a severe problem is developing. The device will allow the equipment operators to estimate the operating time remaining before the equipment must be shut down for inspection and repair. The method utilizes measurements of fluctuations in the current and voltage in a three-phase induction motor to determine the time-varying motor torque. The computed time-varying torque is converted to the frequency domain using fast Fourier transforms and the rotating element torsional natural frequencies are determined. The torsional natural frequencies are also calculated using conventional finite element techniques for various simulated crack depths. The observed torsional natural frequencies are then compared with a table of calculated natural frequencies to determine crack depth.

14 Claims, 5 Drawing Sheets

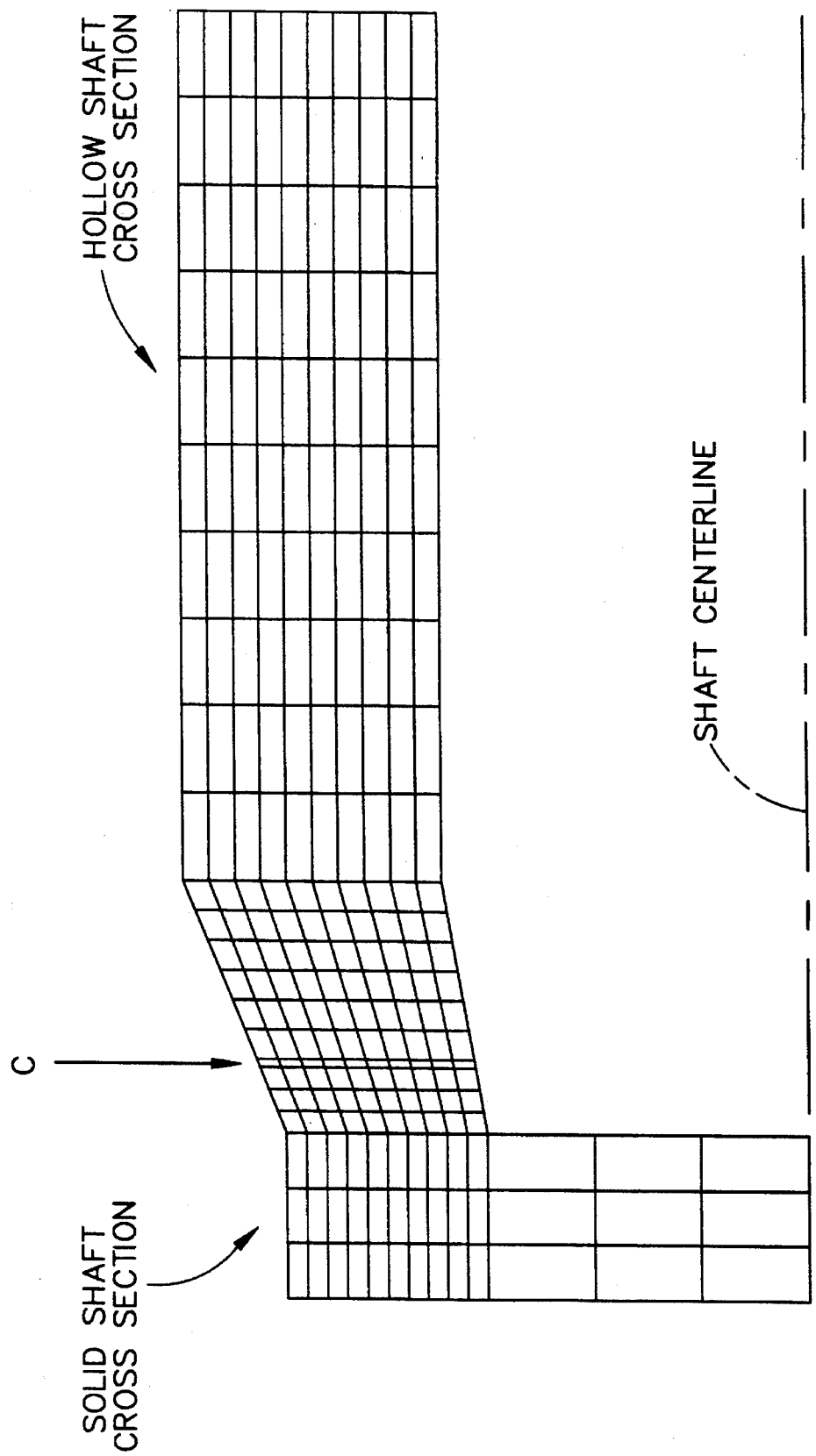

ON-LINE SHAFT CRACK DETECTOR

FIELD OF THE INVENTION

This invention relates generally to the detection of cracks in rotating machinery. In particular, the method and apparatus of the invention are useful in detecting cracks in shafts which connect a driving component to a driven component.

BACKGROUND OF THE INVENTION

In some instances, shaft cracks have developed in high-energy rotating machinery. Sometimes these cracks propagate and cause the shaft to completely sever and fail during operation. These shaft failures, although infrequent, usually occur at inopportune times. These failures cost the equipment owner substantial financial losses for repairs and from equipment downtime. These unexpected shaft failures can also cause secondary damage to surrounding equipment. And in some rare cases, shaft failures can injure plant personnel.

In the past, rudimentary shaft crack detection was possible by monitoring the lateral vibration of the rotating shaft. These lateral vibration measurements are most frequently taken at the exposed section of the shaft, between the driver (motor) and driven component (e.g., pump, turbine or generator). The shaft crack must be quite deep before the shaft lateral vibration characteristics change sufficiently to make detection possible. Typically, the shaft crack must be in excess of 50% of the shaft diameter for a solid shaft and nearly through wall for a hollow shaft for detection to be possible from lateral vibration measurements. However, if a crack has grown to the extent that it can be detected by monitoring the shaft's lateral vibration, then shaft failure is imminent. In some instances, the shaft has less than 24 hours of available operation prior to complete failure after detection by lateral vibration measurements.

Monitoring the torsional vibration characteristics of a rotating driver, shaft and driven component allows for earlier detection of a shaft crack. The standard method of monitoring shaft torsion is accomplished by mounting strain gages on the surface of the exposed shaft and transmitting this strain data from the shaft using slip rings. Many layers of slip rings are needed to make the needed electrical contacts between the torsion strain gage rosetta and the respective strain gage signal conditioning.

Recently, techniques have been developed to transmit the strain gage data to the signal conditioning using telemetry. For the telemetry device a battery or inductance coil, wrapped partially around a shaft, is needed to provide sensor electrical power. These strain gage devices, utilized to measure shaft torsion on-line, are expensive, difficult to use and lacking in torsion signal resolution for proper shaft crack detection.

Both of these methods entail significant alteration of the shaft and require open space on the shaft which is normally unavailable. Some torque meters require cutting of the shaft and insertion of the transducers. Electrical noise can be induced in the data transmission, leading to unacceptable errors. The insertion of mechanical sensing and data collection may itself reduce the useful life of the rotating part due to additional weight, misalignment and wear.

Therefore, a need exists for a method of detecting cracks in a rotating shaft using a torque sensor not mounted on the shaft. In addition, a need exists for a method of detecting and estimating the depth of a crack in a rotating shaft at an early stage prior to actual shaft failure.

SUMMARY OF THE INVENTION

The invention is a device for detecting a circumferential or thumbnail-shaped transverse crack which has developed in a shaft connecting a driving component (motor) to a driven component (pump). After the crack has been detected at an early stage, the depth of the crack is estimated.

In accordance with the method of the invention, crack detection and crack size estimation are performed while the machinery is operating. Thus the shaft monitoring device of the invention will alert equipment operators that a severe problem is developing. The device will allow the equipment operators to estimate the operating time remaining before the equipment must be shut down for inspection and repair.

The method of the invention utilizes computations of the time-varying motor torque based on measurements of the fluctuations in current and voltage in the three-phase induction motor which is driving the shaft. The measured torque in the time domain is converted to the frequency domain using fast Fourier transforms and the rotating element torsional natural frequencies are determined. The torsional natural frequencies are also calculated using conventional finite element techniques for various simulated crack depths. The measured torsional natural frequencies are compared with a table of finite element calculated natural frequencies to determine crack depth.

The preferred embodiment of the invention utilizes an indirect method of measuring the torsion output from an electric motor. In particular, the fluctuations in the current and voltage being drawn by the motor are detected for all three phases to determine the time-varying motor torque. This is accomplished using a motor torsion sensor which measures the three phases of time-varying current and voltage. This acquired data is then digitized and processed data to obtain the time-varying motor torque. In addition, a conventional sensor is used to detect the shaft rotational speed as a function of time. Knowing the shaft rotational speed as a function of time and the inertial properties of the rotating element, the time-varying torque in the shaft located between the motor armature and driven component (e.g., pump impeller) can be calculated.

If one transforms the time-varying shaft torsion, measured using the motor torsion sensor, from the time domain to the frequency domain (using standard fast Fourier transforms or spectrum analysis techniques), then the predominant rotating element torsional frequencies can be determined. Torsional spectral peaks will be found at multiples of the rotational speed, at the torsional natural frequencies and at forced vibration frequencies of the rotating element.

The invention relies on the principle that the rotating element torsional natural frequencies will remain constant for a crack-free shaft. These rotating element torsional natural frequencies will decrease as a crack is initiated and then propagates through the shaft. Using finite element analysis, the change in the torsional frequencies as a function of crack size and shape can be calculated. Using the relationship of the change in torsional natural frequencies as a function of crack depth, one can detect a crack and estimate its size on-line, as the equipment is operating.

BRIEF DESCRIPTION OF THE DRAWINGS

FIG. 3 shows a finite element model for a rotating shaft having a solid portion and a cracked hollow portion.

DETAILED DESCRIPTION OF THE PREFERRED EMBODIMENT

The method and apparatus of the invention are described below with reference to a hollow shaft model for the sake of simplicity and convenience. The analysis assumes that a circumferential crack in the wall of a hollow shaft extends all around the circumference. However, it should be understood that the same method and apparatus are applicable to a solid shaft, without assuming that the crack extends completely around the solid shaft. As a result, a more complex finite element analysis is required in the case of solid shafts.

Figure 1A:
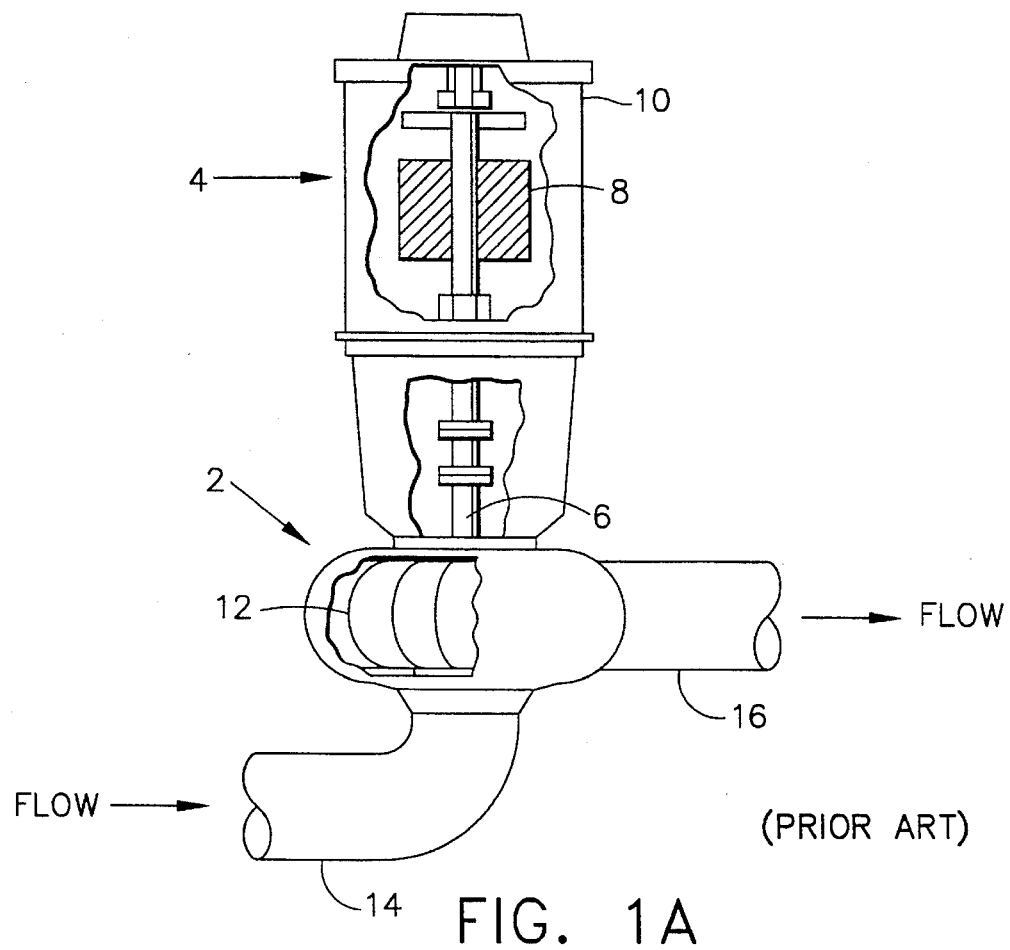
FIGS. 1A and 1B are schematics of a conventional motor/pump assembly and the electrical circuitry of a conventional three-phase induction motor, respectively.

The present invention is particularly suited for detecting cracks in the shaft 6 of an assembly comprising a pump 2 driven by a three-phase induction motor 4, as depicted in FIG. 1A. A motor armature or rotor 8 is mounted near one end of shaft 6 and a pump impeller 12 is mounted on the other end of the shaft. A torque is applied to rotor 8 by electromagnetic induction between the rotor and a stator (not shown in FIG. 1A) receiving alternating current. The rotor, stator and shaft are all encased in motor casing 10. The torque applied to shaft 6 causes the pump impeller 12 to rotate, thereby impelling liquid flow from inlet 14 to outlet 16.

Figure 1B:
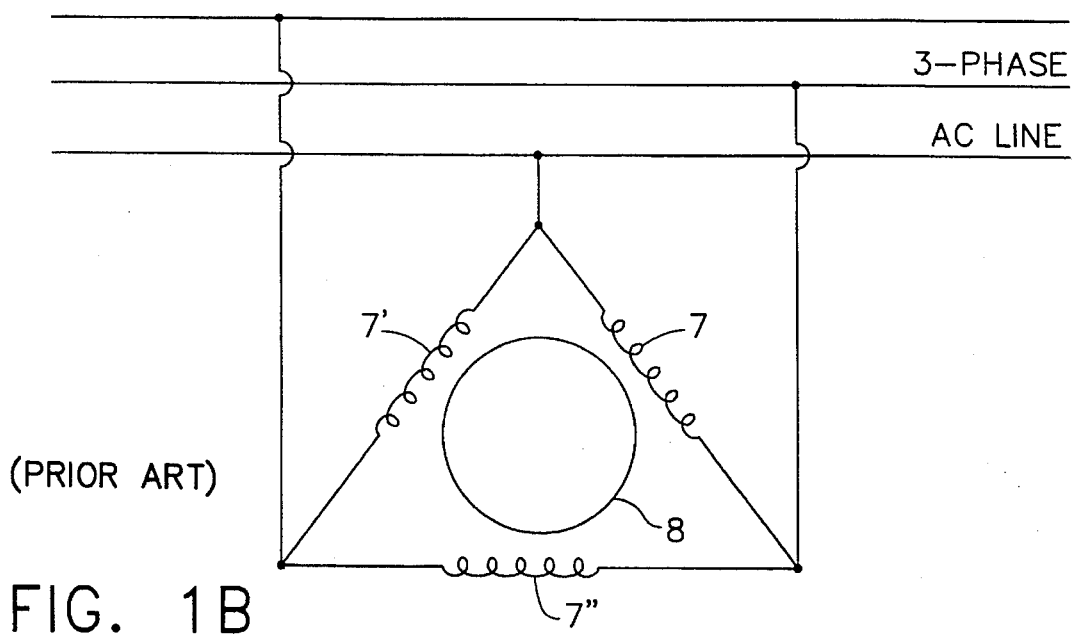

In accordance with one conventional configuration, the induction motor 4 has three stator coils 7, 7', 7" (see FIG. 1B) arranged in a delta configuration and respectively coupled to the three phases of an alternating current line. The phased currents which flow through the respective stator coils produce a torque on the rotor 8 by electromagnetic induction.

Figure 2A:
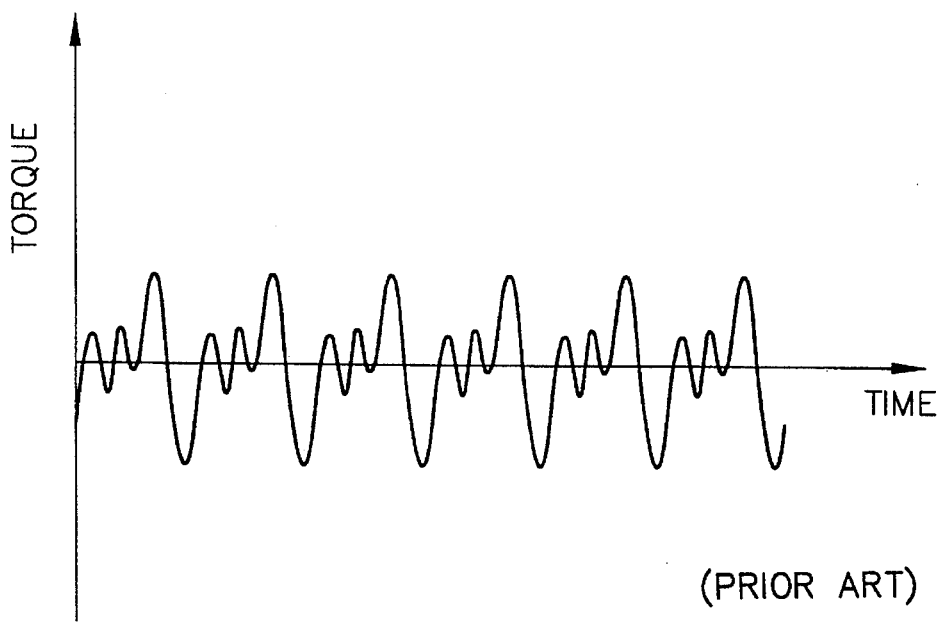
FIG. 2A is a graph depicting the time-varying torque signal obtained by measuring fluctuations of the current and voltage in a three-phase induction motor when the rotating shaft being driven by the motor is free of cracks.

The invention requires that the time-varying torque be calculated and then used to determine the depth of any crack in the shaft. The time-varying torque can be calculated from fluctuations in the currents and voltages drawn by the motor. Conventional meters can be used to measure the current and voltage as a function of time. The resulting analog signals are then digitized for further processing by a central processing unit (CPU in FIG. 5). The digitized current and voltage signals are then used to calculate the time-varying torque in accordance with the following known algorithm:

$$T_c = \left(\frac{3}{2}\right)\left(\frac{P}{2}\right)(\lambda_{ds}i_{qs} - \lambda_{qs}i_{ds})$$

where P is power; i is current and $\lambda$ is the integral over time of the quantity (v−iR), where v is voltage and R is resistance. This algorithm is given by Krause in "Analysis of Electric Machinery", McGraw-Hill Book Company, New York, p. 178. A typical time-varying torque signal is depicted in FIG. 2A.

In addition, the invention requires that the shaft rotational speed be determined, to enable the operator to distinguish the rotating element torsional natural frequencies from the rotating element speed in the frequency spectra. This can be accomplished using any conventional means for detecting the speed of a rotating shaft. For example, the circumferential surface of the shaft can be inscribed with an axially directed line or mark. The line or mark has an optical property different than that of the remaining circumferential surface, e.g., the line or mark is reflective and the remaining space is not reflective. The line or mark is optically detected using a light-emitting diode (LED) and a photodetector suitably arranged so that the light transmitted by the LED is reflected by the line or mark and then detected by the photodetector one time for each shaft rotation. Alternative methods of generating the data, such as eddy-current probes, magnetic pick-ups, and infra-red illumination and detection, are equally suited for use in the invention.

Figure 2B:
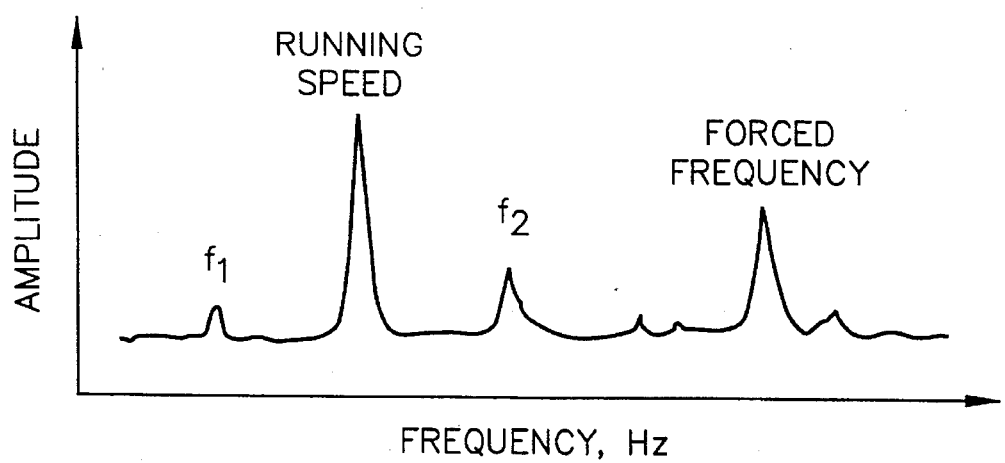
FIG. 2B is a graph depicting the spectra of the torque signal depicted in FIG. 2A.
Figure 5:
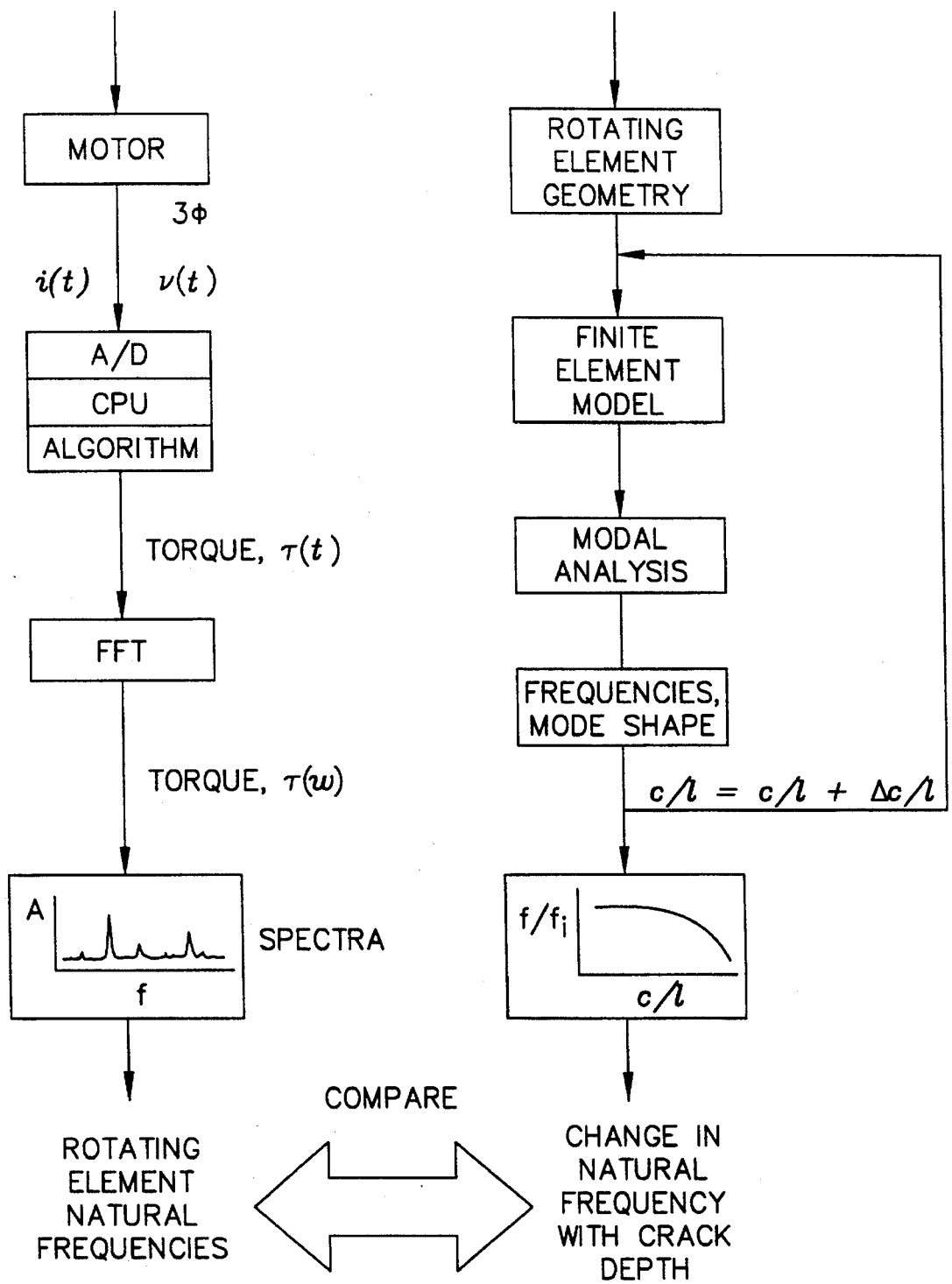
FIG. 5 is a flowchart depicting the steps performed in the method for detecting crack depth in accordance with the invention.

After the time-varying torque has been calculated, the torque is transformed from the time domain to the frequency domain using standard fast Fourier transforms (FFT in FIG. 5). Alternatively, conventional spectral analysis techniques can be used. A typical frequency spectrum will have torsional spectral peaks at multiples of the rotational speed, at the torsional natural frequencies and at forced vibration frequencies of the rotating element, as shown in FIG. 2B.

The invention relies on the principle that the rotating element torsional natural frequencies will remain constant for a crack-free shaft and will be shifted as a function of crack depth when a crack is present in the shaft. In particular, the rotating element torsional natural frequencies $f_1$ and $f_2$ shown in FIG. 2B will decrease (i.e., shift to the left) as a crack is initiated and then propagates through the shaft. The key to the method of the invention is to measure the amount of that frequency shift (decrease) and then determine the crack depth in accordance with the functional relationship between the torsional natural frequencies and crack depth.

The functional relationship between the torsional natural frequencies and crack depth is determined by finite element analysis. In accordance with conventional finite element analysis techniques, the first step is to create a geometric model of the rotating shaft and other connecting components, such as the motor armature and the pump impeller. For example, a geometric model of the rotating shaft is created by dividing the shaft into an array of discrete elements, such as is depicted in FIG. 3 for a shaft having a solid portion and a hollow portion. The location of a simulated crack in the hollow shaft is indicated by the letter C in FIG. 3.

After creation of the geometric model, an overall stiffness characteristic $K_0$ is calculated for a shaft made of a predetermined material, e.g., steel, and having a crack of depth c=0.1l, where l is the thickness of the hollow shaft wall. The overall stiffness characteristic $K_i$ is calculated for a finite element model having two successive elements with a strength of zero corresponding to the root of the crack of unit length (assuming an element having a height of 0.05l). Then a modal analysis is performed. The ratio of the torsional natural frequency f of the crack-free shaft to the torsional natural frequency $f_i$ of the cracked shaft is treated as being proportional to the square root of the ratio of the stiffness of the crack-free shaft to that of the cracked shaft, i.e., $(K_0/K_i)^{1/2}$. The frequency $f_i$ is determined. This process is repeated for simulated cracks having increasing depths, the depth being increased by $\Delta c=0.05l$ for each iteration. Thus the stiffness $K_i$ is successively calculated for a finite element model having two, three, etc. successive elements with a strength of zero representing a crack of increasing depth.

Figure 4:
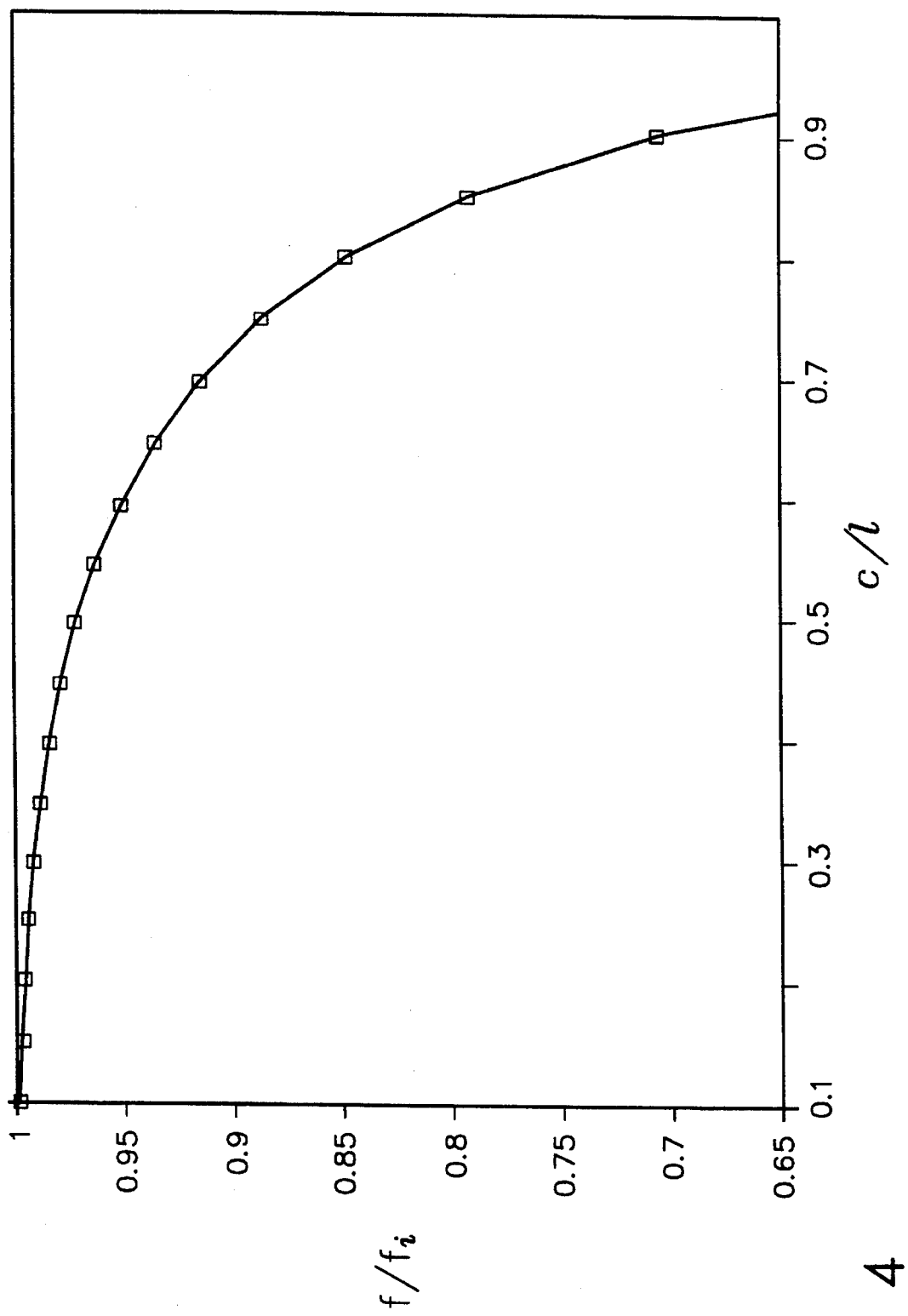
FIG. 4 is a graph depicting the torsional natural frequency of a hollow rotating shaft as a function of crack depth as determined by finite element analysis in accordance with the method of the invention.

The stiffness of the cracked shaft as a function of simulated crack depth is given in the following Table. The frequency ratio as a function of crack depth, as determined by the finite element analysis, also appears in the Table and is plotted in FIG. 4.

| Crack Depth c/l | Stiffness $K_i$ | Freq. Ratio $(K_o/K_i)^{1/2}$ |
| --- | --- | --- |
| 0.1  | 1.815410 | 0.998595 |
| 0.15 | 1.813084 | 0.997955 |
| 0.2  | 1.809418 | 0.996946 |
| 0.25 | 1.804092 | 0.995478 |
| 0.3  | 1.796703 | 0.993437 |
| 0.35 | 1.786733 | 0.990677 |
| 0.4  | 1.773513 | 0.987005 |
| 0.45 | 1.756167 | 0.982166 |
| 0.5  | 1.733539 | 0.975818 |
| 0.55 | 1.704071 | 0.967489 |
| 0.6  | 1.661852 | 0.955429 |
| 0.65 | 1.608111 | 0.939853 |
| 0.7  | 1.538789 | 0.919373 |
| 0.75 | 1.447899 | 0.891808 |
| 0.8  | 1.326261 | 0.853526 |
| 0.85 | 1.159150 | 0.797943 |
| 0.9  | 0.921466 | 0.711446 |
| 0.95 | 0.566905 | 0.558030 |
| 1.0  | ERR | ERR |

The finite element analysis enables the designer to see how a hollow shaft will behave as a crack is initiated and then propagates through the shaft wall. Using the calculated frequency ratio versus crack depth relationship derived from the finite element analysis and using the observed frequency ratio as derived from the fluctuations in the currents and voltages being drawn by the motor, the actual crack depth can be estimated. For example, if the ratio of the observed torsional natural frequency of a cracked shaft to the observed torsional natural frequency of a crack-free shaft is ≈0.987, then the look-up table indicates that the crack depth c=0.4 l. Thus, this method enables the operator to detect a crack and estimate its size on-line, as the equipment is operating and before complete failure of the shaft.

The foregoing apparatus has been disclosed for the purpose of illustration. Variations and modifications of the disclosed apparatus will be readily apparent to practitioners skilled in the arts of torque detection, finite element analysis and modal analysis. For example, although the preferred embodiment has been described in relation to crack detection for a hollow rotating shaft, the teachings of the present invention have application in the detection of cracks in a solid rotating shaft. The finite element model must be adapted to reflect the solid geometry and the modal analysis must be adapted to reflect asymmetrical crack propagation in the radial plane. All such variations and modifications are intended to be encompassed by the claims set forth hereinafter.

I claim:

1. A method for monitoring the depth of a crack in a rotating element driven by a motor, comprising the steps of:

generating a table of data showing the change in simulated torsional natural frequency of a geometric model of said rotating element as a function of simulated crack depth;

measuring a torsional natural frequency of said rotating element; and identifying a simulated crack depth corresponding to said measured torsional natural frequency in said table of data, wherein said step of measuring a torsional natural frequency comprises the steps of determining the time-varying torque of said rotating element by measuring fluctuations in the current and voltage being drawn by said motor and transforming said time-varying torque to the frequency domain.

2. The method as defined in claim 1, wherein said table of data is generated by modal analysis of a finite element model of said rotating element.

3. The method as defined in claim 2, wherein said finite element model represents a hollow shaft.

4. The method as defined in claim 2, wherein said finite element model represents a solid shaft.

5. The method as defined in claim 1, wherein said step of transforming said time-varying torque to the frequency domain is performed using fast Fourier transforms.

6. An apparatus for monitoring the depth of a crack in a rotating element driven by a motor, comprising:

means for storing a table of data showing the change in simulated torsional natural frequency of a geometric model of said rotating element as a function of simulated crack depth;

means for measuring a torsional natural frequency of said rotating element; and means for identifying a simulated crack depth corresponding to said measured torsional natural frequency in said table of data, wherein said means for measuring a torsional natural frequency comprises means for determining the time-varying torque of said rotating element and means for transforming said time-varying torque to the frequency domain, and wherein said means for determining the time-varying torque of said rotating element comprises means for measuring fluctuations in the current and voltage being drawn by said motor.

7. The apparatus as defined in claim 6, wherein said table of data is generated by modal analysis of a finite element model of said rotating element.

8. The apparatus as defined in claim 7, wherein said finite element model represents a hollow shaft.

9. The apparatus as defined in claim 7, wherein said finite element model represents a solid shaft.

10. The apparatus as defined in claim 6, wherein said means for transforming said time-varying torque to the frequency domain comprises means for performing fast Fourier transformation.

11. A method for monitoring the depth of a crack in a rotating element driven by a motor, comprising the steps of:

determining a functional relationship between change in a simulated torsional natural frequency of a geometric model of said rotating element and simulated crack depth;

measuring a torsional natural frequency of said rotating element; and determining a crack depth corresponding to said measured torsional natural frequency in accordance with said functional relationship, wherein said step of measuring a torsional natural frequency comprises the steps of determining the time-varying torque of said rotating element by measuring fluctuations in the current and voltage being drawn by said motor and transforming said time-varying torque to the frequency domain.

12. The method as defined in claim 11, wherein said functional relationship is determined by modal analysis of a finite element model of said rotating element.

13. The method as defined in claim 11, wherein said step of transforming said time-varying torque to the frequency domain is performed using fast Fourier transforms.

14. The method as defined in claim 11, wherein said simulated torsional natural frequency decreases as said simulated crack depth increases.

\* \* \* \* \*